Figure 1:
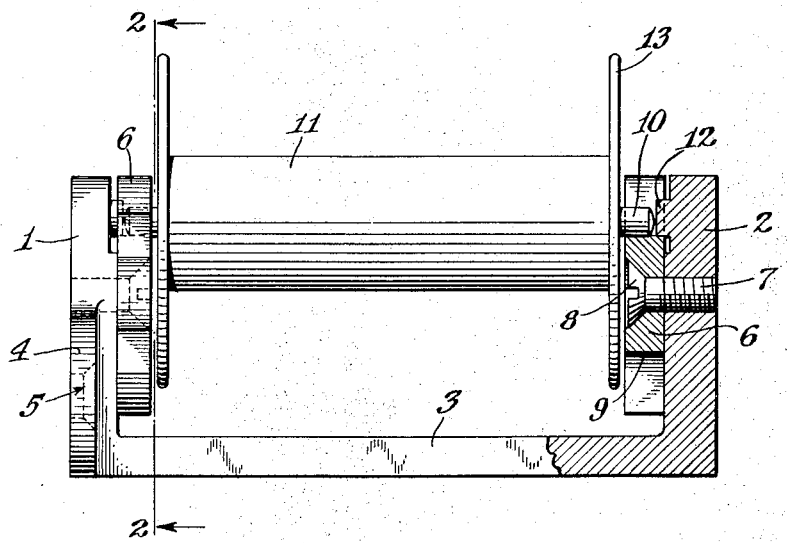

May 22, 1934.    W. E. BENNETT    1,959,996
SUPPORTING MEANS FOR BOBBINS
Filed May 5, 1932

INVENTOR
Walter E. Bennett
BY Henry Van Arsdale
ATTORNEY

Patented May 22, 1934

1,959,996

UNITED STATES PATENT OFFICE 1,959,996

SUPPORTING MEANS FOR BOBBINS

Walter E. Bennett, Honesdale, Pa., assignor to Clover Leaf Manufacturing Co., Honesdale, Pa., a corporation of Pennsylvania Application May 5, 1932, Serial No. 609,356

1 Claim. (Cl. 242—130)

This invention relates to supporting means for bobbins, reels and other rotatable things, and includes bearings and supports therefor.

Heretofore it has been customary to provide bobbin brackets, or supports, with single bearing notches for the bobbin, with the result that when one of these bearing notches becomes worn down so much that the bobbin is no longer held in proper alignment on the bracket it has been necessary to discard the entire bracket and to substitute a new one, or at least to remove the part having the worn out bearing notch and to substitute a new part, if this should be possible and expedient.

The principal object of this invention is to provide simple and efficient means for rotatably supporting bobbins, reels and other rotatable things in an effective and convenient manner and so as to result in saving of expense and conservation of time and effort, and, more specifically, an object of this invention is to provide a combined bearing member and support for bobbins, reels and other rotatable things, and capable of highly efficient service for a greatly prolonged period of time and use without requiring the removal, discarding or substitution of either the support or the bearing member or any part of them.

A further object of this invention is to provide a separate bearing member for bobbins, reels and other rotatable things and one which is simple, durable and inexpensive in construction, and one which has a greatly prolonged life of highly efficient service; and a bearing member that may be mounted on and removed from a convenient bracket or support therefor, easily and quickly for use or replacement, or for other purposes.

Another object of this invention is to provide a separate bearing member having a plurality of separate and successively usable bearing surfaces, and adapted to be so mounted on a suitable bracket or support therefor as to permit any of the bearing surfaces to be brought singly into operative position on the bracket or support readily and easily.

Another object of this invention is to provide simple and effective means for holding the separate bearing member in selected position on the bracket or support without interfering with the ease with which the bearing member may be placed on, removed from, or its position changed on its bracket or support; and a further object of this invention is to provide means for centering the bobbin or reel between opposite bearing members mounted on a suitable bracket or support, and whereby the ends or heads of the bobbin or reel are held sufficiently spaced from the adjacent bearing members so as to avoid objectionable contact therewith when the bobbin or reel rotates. The positioning means for the bearing members and the centering means for the bobbin or reel may be the same although, if desired, separate means may be provided for each function.

Other objects of this invention will be in part obvious and in part pointed out hereinafter.

In accordance with this invention the supporting means include a member having a plurality of spaced and successively and separately usable bearing surfaces, and adapted to be so mounted that the bearing surfaces may be placed separately and selectively in operative service position, so that when one bearing surface becomes worn out another of the bearing surfaces may be brought into operative service position, with the result that nothing need be removed, discarded or replaced until all of the bearing surfaces have become worn out, and the service life of the article is extended proportionately. Preferably, the bearing surfaces are provided on separate bearing members adapted to be mounted on a suitable bracket or support in such a way as to permit the various bearing surfaces thereof to be placed singly and selectively in operative position, and also so mounted as to permit substitution of a new bearing member to replace one whose bearing surfaces are all worn out, thus making it possible to continue the bracket or support in use permanently. Preferably, means are provided on the bracket or support adapted to engage whichever bearing portion of the bearing member is aligned therewith to hold the bearing member in set position on the bracket or support. The bearing portion in service position may be so engaged; and said means at the same time may constitute an abutment for the end of the pin on the bobbin or reel which engages this bearing portion, so that said positioning and abutment means will not only hold the bearing member in set position but will also center the bobbin or reel and will keep the end or head of the bobbin or reel out of contact with the bearing member. Optionally, there may be means engaging one portion of the bearing member to hold it in set position, and other means engaging another portion of the bearing member to serve as a centering abutment for the bobbin or reel pin or shaft.

Figure 2:
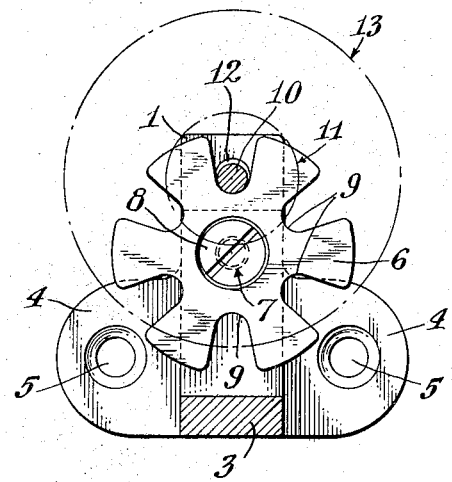

In order that a clearer understanding of this invention may be had, attention is hereby directed to the accompanying drawing, forming a part of this application, and illustrating certain possible embodiments of this invention, and in which:

Fig. 1 is a side view of a bobbin operatively supported on a structure embodying this invention, a portion of the structure being shown in section, and Fig. 2 is a sectional view thereof, and is taken on the line 2—2 of Fig. 1, the head of the bobbin being indicated by dot and dash lines.

Similar reference characters refer to similar parts throughout both views of the drawing.

Referring to the drawing, there is shown therein a support or bracket comprising opposite end arms 1 and 2, connected at the base by an integral cross piece or cross bar 3. Arm 1 is formed with wings 4 having screw holes 5 for the purpose of attachment to a textile machine or other structure (not shown) in the conventional manner. Against the inner surface of each of the arms 1 and 2 is mounted a separate bearing member, such as 6, which are similar to each other. Each bearing member 6 is mounted on the adjacent arm by means of a screw 7 which extends through a hole in the center of the bearing member, and is in threaded engagement with a threaded hole formed in the arm, each screw having a head 8 seating in a recess provided therefor in the bearing member. Extending inwardly from the periphery of each bearing member are a plurality of spaced and separate bearing notches 9. When the screw 7 is loosened, the bearing member 6 may be rotated on the screw to place any one of the bearing notches 9 in uppermost position and, in the embodiment shown, a notch thus located is in service position and is adapted to rotatably support and provide a bearing surface for the end pin 10 (or the adjacent end of the shaft) of a bobbin 11 in service position on the supporting means.

In the embodiment shown, each of the bracket arms 1 and 2 is provided with a lug or stud 12 adapted, when the bearing member is brought against the bracket arm, to extend some distance into the bearing notch 9 which is positioned in uppermost or service position. Accordingly, this lug acts as positioning means and prevents such movement of the bearing member as would take that notch out of effective service position. Lug 12 preferably extends into the bearing notch a sufficient distance to provide an abutment for the end of the bobbin pin 10, and thus serves to hold the head 13 of the bobbin spaced sufficiently from the bearing member 6 to avoid contact therebetween. Such contact would be objectionable as creating friction and possibly interfering with the free and smooth rotation of the bobbin.

Obviously, the structure and the parts thereof may be made of any one of a number of different materials or combinations of material. For instance, the bearing members 6 may be made entirely of material which is highly resistant to wear, such as iron, steel, fibre, etc., or the body of the bearing member may be made of one material and the bearing notches 9 be lined with a different material which offers more resistance to wear.

With a structure embodying this invention, it will be readily apparent that no part need be discarded, removed or replaced until all of the bearing surfaces at one end of the bobbin have become so worn out as to be no longer serviceable, and thus the serviceable life of the entire supporting means is greatly prolonged before any part need be discarded or a substitution made.

In the embodiment illustrated, when one bearing surface of a bearing member becomes so worn as to be no longer serviceable, it is merely necessary to loosen the screw 7, turn the bearing member thereon to place one of the other unworn bearing notches into service position, and then retighten the screw. When all of the bearing surfaces of one of the bearing members have become worn out, it is a simple matter to remove the screw 7 from the bracket arm and the worn-out bearing member, and to place the screw in a new bearing member and screw the new bearing member on the bracket. Thus, the bracket itself is permanent and may be used indefinitely with numerous successive bearing members.

The serviceable life of the bearing member depends, of course, on the material of which it is constructed, or the material with which the bearing notches are lined, and also on the number of separate and successively usable bearing surfaces the bearing member has. The more resistant the bearing surfaces are to wear, and the greater the number of bearing surfaces on the bearing member, the longer will be the length of its service life.

Although the bearing members illustrated in the drawing are shown to be somewhat circular, their periphery may be angular, or they may assume any other suitable shape or form, as desired. Also, instead of providing bearing notches as illustrated, there may be provided holes, sockets, or bearing pins or studs instead. In the latter case the bobbin or reel would be provided with sockets for the pins, instead of with pins adapted to seat in the bearing notches or sockets of the bearing members.

It is obvious from the above that this invention is not limited to supporting bobbins and reels alone, but is applicable to supporting many different sorts of rotatable things. It is also apparent that many changes could be made in the above construction and many apparently widely different embodiments of this invention could be made without departing from the scope thereof, and, therefore, it is understood that all matter contained in the above description, or shown in the accompanying drawing, be interpreted as illustrative and not in a limiting sense.

What I claim is:

The combination with a supporting member, of a disk-like bearing member having a plurality of bearing notches in spaced relation about its periphery so as to be usable separately and successively, and having a central perforation for an attachment screw, an attachment screw in said perforation and engaging the supporting member, so mounting the bearing member on the supporting member as to permit the placement of said bearing notches separately and selectively in operative service position on the supporting member, a bobbin supported on the supporting member and having a head and a bearing pin seated in the service positioned notch of the bearing member, and a stud on the supporting member adapted to seat in any bearing notch placed in service position to hold the bearing member against displacement, and extending a sufficient distance into said notch to abut the end of said bearing pin of the bobbin and to maintain the adjacent head of said bobbin spaced from the bearing member.

WALTER E. BENNETT.